Patented Mar. 3, 1942

2,275,049

UNITED STATES PATENT OFFICE 2,275,049

POLISH

Edwin W. Keller, Allentown, Pa.

No Drawing. Application April 15, 1940,
Serial No. 329,723

7 Claims. (Cl. 106—3)

This invention relates to polishes for metal, and particularly for bright metal and metal plating, such as copper, brass, aluminum, and silver, including tableware and other silver and silver-plated articles. An aqueous polish of this general character, disclosed in my application Serial No. 108,212, filed October 29, 1936, now Patent No. 2,196,992, granted April 16, 1940, may consist of tin oxide as an abrasive, lauryl alcohol sulfate as a dispersing or suspending agent, and sodium silicate of relatively low alkali-silica ratio as a detergent. These ingredients do not leave a surface film of alkali on the metal that is polished, and do not form a hard cake on standing. (The "hard cake" here referred to is an agglomeration of the abrasive and other material of the polish into a mass which cannot readily be redistributed by shaking, and is to be distinguished from soft settlings, that are easily redistributed by shaking.)

I have now discovered that a polish possessing these and other advantages can be prepared with finely divided abrasive silica in admixture with detergent alkali silicate, which need not be of low alkali-silica ratio, and may preferably be of relatively high alkali-silica ratio in some cases.

Silica is a more effective polishing abrasive for removing the tarnish of oxide and sulfide or the like from metal than is tin oxide, though it has the drawback of a tendency to hard caking with alkali silicate. Without impairing the detergent action due to the alkali, the soluble silica of sodium silicate or the like protects the metal being cleaned or polished from too drastic alkalinity, and is helpful in maintaining the particles of silica in suspension. A very moderate amount of alkali silicate in the polish suffices to afford the desired detergent action for removing dirt, oil, or the like, yet does not render the solution objectionably alkaline for metals on which it may be desired to use the polish. Moderate alkalinity is desirable in the composition; whereas acidity would tend to corrosion of the work, and is not to be desired. However, sodium silicate of high alkali-silica ratio is apt to be accompanied by hard caking of the silica with the silicate.

I have found that the tendencies of alkali silicate toward hard caking with silica can be overcome by including in the composition a supplemental ingredient whose particles settle out of suspension with those of the silica, on standing, and prevent hard caking of the silica with the silicate—one preferred ingredient for this purpose being calcium sulfate. With or instead of calcium sulfate may also be used metallic oxides whose particles do not by themselves cake with the alkali silicate, but (on the contrary) settle out of aqueous suspension along with the silica, and so tend to prevent hard caking, and especially an oxide (or oxides) of tin, zinc, titanium, magnesium, iron, or even lead. Though unobjectionable, effective abrasive properties are not at all necessary in the supplemental ingredient(s) used: e. g., zinc oxide, which lacks abrasive power, answers just about as well in my new composition as does tin oxide, which has sufficient abrasive power to be used as the sole abrasive in the metal polish of my aforementioned Patent No. 2,196,992. While oxides are generally inferior to calcium sulfate in their power to prevent caking, they may nevertheless be used in lieu of it with fairly satisfactory results, especially when a crystalloidal sodium silicate of relatively high alkali-silica ratio is employed.

The presence of lead in a polishing composition is generally objectionable, because of its highly toxic properties; but as regards prevention of caking, lead oxide is substantially or nearly on a par with calcium sulfate. In this respect, indeed, these substances form a special group, greatly superior to the other members of the large group of supplemental ingredients above mentioned. For example, the use of either one of these substances in my composition makes it practicable to use alkali silicates of widely varying alkali-silica ratio—from a high ratio such as 1:1.58 to a low ratio such as 1:3.9—whereas with other oxides, the tendency toward hard caking of silica with alkali silicate may be objectionable unless the alkali-silica ratio is quite high. And besides preventing caking, these substances show much greater suspending power than the other supplemental ingredients above mentioned: i. e., when the composition is allowed to stand, its solids (silica and calcium sulfate or metallic oxide) settle more slowly, and less compactly. Lead oxide, however, presents no advantage over calcium sulfate to balance the serious drawback of its own toxicity; on the contrary, the balance of other differences between the two substances inclines toward calcium sulfate.

In my new composition, the tendency of silicate of high alkali-silica ratio to leave an alkali film on the metal is overcome by the abrasive power of the silica, while (as above mentioned) the tendency of silicate of high alkali-silica ratio to form a hard cake with silica in the presence of metallic oxide is decidedly less than that of sodium silicate of low alkali-silica ratio. This is in marked contrast with the behavior of silicate of high alkali-silica ratio in the absence of silica: e. g., if it is attempted to substitute such high-alkali silicate for low-alkali silicate in the composition described in my above-mentioned Patent No. 2,196,992, with tin oxide alone as the abrasive, the abrasive power of the tin oxide does not suffice to prevent an objectionable film on the work. Fortunately for the success of that composition, the low-alkali silicate not only has less film-forming tendency, but in the absence of silica does not form a hard cake with tin oxide, as it does when silica is present.

A suspending agent is desirable for the silica and the supplemental ingredients(s), and may consist of lauryl alcohol sulfate, such as marketed under the trade names "Gardinol," "Orvus," or "Duponol." Lauryl alcohol sulfate (hereinafter generally referred to as "Duponol," for brevity) is an excellent wetting, dispersing, and scouring agent; is not affected by the presence of alkalies in either high or low concentrations, nor by hard water; tends to prevent tarnishing of the metal that has been polished with the composition; is neutral and compatible with the other ingredients; and does not hydrolyze to give an alkaline reaction. However, other suitable suspending agents (such as well known to chemists) may be substituted, or the use of a suspending agent may even be dispensed with, especially when the more efficient supplemental ingredients above indicated are present in the composition.

Of course suitable diluent or auxiliary substances may be added to the composition, if desired.

The solid ingredients of my composition (silica and calcium sulfate or metallic oxide) are naturally used in a finely divided state, in order to avoid objectionable scratching of the polished surfaces, though the particle size may vary according to the use for which the polish is intended. For fine work such as polishing silverware, fine grades and grain sizes of the solid ingredients that are commonly used as pigments in linseed-oil paints are very suitable, and grades of this character that have given good results are hereinafter indicated. For rougher work and for harder metals, coarser grain sizes may be used, especially for the abrasive ingredient(s).

The silica used may be of the soft, amorphous, diatomaceous type, or may be a quartz ground extremely fine. Diatomaceous silica is generally preferred for silver, while fine-ground quartz may be better for harder metals, that offer less danger of scratching. Commercial non-colloidal grades of silica that have proved satisfactory are as follows:

(1) "Extra Fine Imported Silica," Harshaw Chemical Company: a soft amorphous quality, of which 99% passes a 325 mesh screen, and showing a typical analysis as follows:

| | |
|---|---|
| $SiO_2$ | 88.9 |
| $Al_2O_3$ | 10.0 |
| $Fe_2O_3$ | .3 |
| CaO | .4 |
| MgO | .4 |

(2) "000 Multi-cel AA Silica," Tamms Silica Company: a soft, amorphous, diatomaceous silica ground so fine that over 98% passes a 325 mesh screen, showing by analysis about 92% silica and about 8% alumina.

(3) "Snow Floss," Johns-Manville Corporation: an especially pure diatomaceous silica distinguished by great bulk in proportion to weight, and so fine that all but a trace passes a 325 mesh screen.

(4) "Celite C-13200," Johns-Manville Corporation: an amorphous silica ranging between 40 microns and less than 1 micron in particle size, but mostly within a range of 2 to 10 microns, and containing about 94% $SiO_2$, about 4% combined water, and about 2% silicate combinations of alumina, iron, and alkaline earth metals.

(5) "Silica Sand, #325 Mesh Grade," New Jersey Pulverizing Company: a crystalline silica, more suitable for polishing relatively hard metal.

(6) "No. 1-A Silica Rouge," C. K. Williams Company, Easton, Pennsylvania: a fine-ground crystalline silica.

(7) "Pennsylvania Opal Silica," Pennsylvania Pulverizing Company, Lewiston, Pennsylvania: a fine-ground crystalline silica.

Representative commercial grades of various metallic oxides that have proved satisfactory are:

(8) "Pure Tin Oxide," Harshaw Chemical Company: made by exploding or burning tin in air, free from contact with material that might cause contamination or discoloration; containing $SnO_2$ in excess of 99.8%; and of particle size mainly 2 to 1.5 microns, with some particles as large as 3 microns.

(9) "XX601 Zinc Oxide," New Jersey Zinc Company: an American Process acicular zinc oxide, consisting of long, slim needle particles, about ¼ micron in diameter or thickness and ranging up to about 20 microns in length, bulking about .02155 gal. per lb.

(10) "Florence Red Seal-9 Zinc Oxide," New Jersey Zinc Company: a French process cream white product, of slightly less than maximum brightness, bulking about .02155 gal. per lb.

(11) "Magnesium Oxide," Wishnick-Tumpeer, Inc.: of such fineness that 85% passes a 200 mesh screen, and showing a typical analysis as follows:

| | |
|---|---|
| MgO | 91.00 |
| $SiO_2$ | 2.10 |
| CaO | 2.75 |
| Fe and $Al_2O_3$ | .75 |
| Ignition loss | 3.40 |

(12) "Magnesium Oxide USP Extra Light," J. T. Baker Chemical Company.

(13) "Pure Titanium Dioxide, S. D. H. O. Quality," Wishnick-Tumpeer, Inc.: showing a $TiO_2$ content exceeding 99% and passing a 325 mesh screen with a residue of less than 0.1%, of exceptionally fine texture, pure white with a light reflection of approximately 98%, of specific gravity 3.9 and bulking about 0.0308 gal. per lb.

(14) "Titanox-A," Titanium Pigment Corporation: a water-dispersing titanium dioxide whose particles are of 0.3 micron average mean diameter, and practically all pass a 325 mesh screen, of specific gravity 3.90, with a $TiO_2$ content of about 99%.

(15) "Titanox C," Titanium Pigment Corporation: a fine, white composite pigment, of specific gravity 3.20, containing about 30% $TiO_2$ and 70% $CaSO_4$ by weight, the titanium dioxide precipitated on the calcium sulfate and coalesced with it, and the particles being of about 0.55 micron average mean diameter.

(16) "#1319 Terra Alba," C. K. Williams & Company, Easton, Pennsylvania: a natural calcium sulfate ground to such fineness tha' over 98% passes a 325 mesh screen, of specific gravity 2.35, and analyzing:

| | Per cent |
|---|---|
| $CaSO_4 \cdot 2H_2O$ | 99.4 |
| $SiO_2$ | .2 |
| $Al_2O_3$ and $Fe_2O_3$ | .4 |

(17) "#1 Terra Alba," U. S. Gypsum Company: all of which passes a 100 mesh screen, at least 99.5% a 200 mesh screen, and 95% a 325 mesh screen, and of which an illustrative analysis is:

| | Per cent |
|---|---|
| Gypsum ($CaSO_4 \cdot 2H_2O$) | 94.5 |
| Calcium sulfate ($CaSO_4$) | 3.0 |
| Calcium carbonate ($CaCO_3$) | 2.0 |
| Clay impurities | 0.5 |

(18) "Iron Oxide No. 61S Pulverized," American Cyanimid & Chemical Corporation: containing 98% Fe₂O₃ and 2% silica and alumina.

(19) "Sublimed Litharge," Eagle-Picher Lead Company, Joplin, Missouri: of fine particle size, about 90% less than 2 microns, and all less than 4 microns, of which an illustrative analysis is:

| | Per cent |
|---|---|
| PbO | 99.5 |
| Metallic lead, less than | 0.1 |
| Red lead, less than | 0.25 |
| PbSO₄, less than | .20 |
| Other metals, less than | .05 |

Sodium silicate used in my composition may range from low to high in alkali-silica ratio: e. g., from 1:3.9 or less to 2:1 or higher, with a corresponding gravity range from 1.30 to 1.87, or 33.5° Bé. to 67.5° Bé. Low alkali sodium silicates are generally colloidal, while the high alkali silicates (1:1.58 up to 1.5:1) may be somewhat crystalloidal. Illustrative commercial grades of the high alkali and low alkali types are:

(20) "Sodium Silicate, Grade BW," Philadelphia Quartz Company: alkali-silica ratio about 1:1.58; density about 58.5° Beaumé; contains about 19.5% Na₂O and about 31% SiO₂, the rest being nearly all water.

(21) "Sodium Silicate, Grade S," Philadelphia Quartz Company: alkali-silica ratio 1:3.90.

It is to be understood that these particular grades of the various substances are referred to as illustrative of desirable characteristics for these substances, and not as exclusive of other grades: on the contrary, many other grades of various manufacturers will be found perfectly satisfactory. The data illustrate the fact that purity is not essential, especially in the case of the metallic oxides, and that mixtures of various suitable oxides may be used. Likewise, various grades of silica may be used together in any desired proportions.

In making up the composition, the sodium silicate used is preferably very thoroughly mixed with water (by mechanical agitation) in the proportion of 1 to 3 before addition to the other ingredients; and it is this mixture that is referred to in the following illustrative formulae of proportions as "sodium silicate and water." The other water used may contain Duponol previously dissolved therein in the proportion of 4 grains per gallon; and this is what is referred to in the formulae as "water with Duponol." The formulae are illustrative of proportions that have proved practically satisfactory, but are not limiting or definitive of the invention.

*Example A*

| | | |
|---|---|---|
| Water with Duponol | oz | 7¼ |
| Silica (4) | pwt | 4 to 8 |
| Titanox C (15) | pwt | 3 to 8 |
| Sodium silicate (20) and water | cc | 2 to 10 |

*Example B*

| | | |
|---|---|---|
| Water with Duponol | oz | 7¼ |
| Silica (4) | pwt | 8 |
| Calcium sulfate (17) | pwt | 2 |
| Titanium dioxide (13) | pwt | 2 |
| Sodium silicate (20) and water | cc | 2 to 10 |

*Example C*

| | | |
|---|---|---|
| Water with Duponol | oz | 7¼ |
| Silica (4) | pwt | 8 |
| Calcium sulfate (17) | pwt | 4 |
| Sodium silicate (20) and water | cc | 2 to 10 |

*Example D*

| | | |
|---|---|---|
| Water with Duponol | oz | 7¼ |
| Silica (4) | pwt | 8 |
| Litharge, PbO (19) | pwt | 4 |
| Sodium silicate (21) and water | cc | 10 |

*Example E*

| | | |
|---|---|---|
| Water with Duponol | oz | 7¼ |
| Silica (1) | pwt | 12 |
| Tin oxide (8) | pwt | 12 |
| Sodium silicate (20) and water | cc | 10 |

*Example F*

| | | |
|---|---|---|
| Water with Duponol | oz | 7¼ |
| Silica (2) | pwt | 12 |
| Zinc oxide (9) | pwt | 6 |
| Zinc oxide (10) | pwt | 6 |
| Sodium silicate (20) and water | cc | 10 |

*Example G*

| | | |
|---|---|---|
| Water with Duponol | oz | 7¼ |
| Silica (3) | pwt | 8 |
| Magnesium oxide (11) | pwt | 8 |
| Sodium silicate (20) and water | cc | 10 |

*Example H*

| | | |
|---|---|---|
| Water with Duponol | oz | 7¼ |
| Silica (5) | pwt | 12 |
| Titanium dioxide (13) | pwt | 12 |
| Sodium silicate (20) and water | cc | 10 |

*Example I*

| | | |
|---|---|---|
| Water with Duponol | oz | 7¼ |
| Silica (4) | pwt | 12 |
| Iron oxide, Fe₂O₃ (18) | pwt | 12 |
| Sodium silicate (20) and water | cc | 10 |

The problem of maintaining the composition uniform in successive retail batches may be solved by charging each retail container with the proper amount of the "Duponol" solution and then adding thereto the required amounts of the other ingredients, preferably in their order in the formulae. Using an 8 oz. glass bottle as a retail container, 7¼ oz. of the "Duponol" solution is run into it; then the supplemental ingredient(s) and the dry silica are successively introduced and thoroughly mixed in, with agitation after the addition of each; and finally 10 cc. of the sodium silicate solution (containing 2.5 cc. of the commercial sodium silicate) is run in, and the agitation is continued for a couple of minutes longer. After being made up as described, the composition is preferably allowed to stand three or four hours and reagitated, and this is repeated one or more times. This results in better suspension of the ingredients, and slower settling on standing.

While the relative proportions of the ingredients in my composition may be widely varied, certain indications drawn from experience may be helpful in practice.

The proportion of "sodium silicate and water" to total volume of the composition indicated in my formulae gives approximately the maximum detergent effect consistent with other considerations. As little as 2½ cc. has been successfully used, though with reduced cleaning efficacy; and also as much as 16 cc., though without commensurate improvement in cleaning power. Beyond this upper limit of 16 cc., the alkalinity of the composition tends to become excessive, and the work is left streaked after cleaning; below the norm of 10 cc., there is a greater tendency toward hard caking when the solids settle out on standing, although settling goes on more slowly.

The alkali silicate in my composition is substantially unreactive (chemically) toward the non-colloidal silica used.

The proportion of silica indicated in the formulae gives about the best abrasive action: less reduces the effectiveness of the composition and increases the work of polishing, while any substantial excess over the amounts in the formulae is in practice apt to be wasted. The smaller amounts of silica and magnesium oxide in Example G are explained by the great bulk and low density of these particular grades of these substances.

The proportions of the supplemental ingredient(s) in the formulae is adequate without being materially excessive. They not only prevent hard caking when the composition is allowed to stand and settle, but they also coact with the alkali silicate to maintain the finely divided solids in suspension in the liquid and retard settling. In this latter function of maintaining suspension by coaction with the alkali silicate, calcium sulfate and lead oxide are especially efficacious, as already mentioned. In the case of calcium sulfate and lead oxide, an amount equal to half the silica by weight is ample; while in the case of the other oxides, an amount approximately equal to the silica is desirable. The supplemental ingredient(s) may in some cases be reduced to about half the larger amounts in the formulae without apparent disadvantage; but a less amount than this tends to result in objectionable caking. While the proportions of these ingredients can be increased ad libitum, there is no advantage in this; and in extreme excess they might act as diluents to impair the abrasive action of the composition somewhat.

The polish should be thoroughly shaken before using. It is applied (wet) with a soft cloth, and the metal is rubbed until all trace of tarnish or discoloration has disappeared. The residue is then allowed to dry on the metal, and is afterward removed by light rubbing with a clean, soft cloth. In general, the polish has the advantage of being uninflammable, non-poisonous, and non-injurious to the skin; although when it contains iron oxide, as in Example I, it tends to stain the hands rather objectionably; and if it were made with lead oxide as in Example D, it would be dangerously toxic if it should get into an abrasion or cut on the hands.

The polish is stable and remains good indefinitely after mixing, without formation of a hard cake on standing, and without any apparent reaction amongst its ingredients. The silica and the alkali silicate are unreactive toward one another in the composition, and its efficacy remains unimpaired by long keeping.

Having thus described my invention, I claim:

1. A stable, indefinitely-keeping, aqueous liquid polishing composition, comprising finely divided, abrasive silica; sodium silicate, substantially unreactive toward the silica, as a detergent; and finely divided calcium sulfate, for preventing hard caking of the silicate with the silica when the composition is allowed to stand and settle.

2. A stable, indefinitely-keeping, aqueous liquid polishing composition, comprising finely divided, abrasive silica; sodium silicate, substantially unreactive toward the silica, as a detergent; finely divided calcium sulfate, for preventing hard caking of the silicate with the silica, when the composition is allowed to stand and settle; and also titanium dioxide, serving the same purpose.

3. The invention as set forth in claim 2 wherein the titanium dioxide and the calcium sulfate are coalesced, by precipitation of the one on the other.

4. A stable, indefinitely-keeping, aqueous liquid polishing composition consisting essentially of finely divided, abrasive silica; sodium silcate, substantally unreactive toward the silica, as a detergent; and an insoluble metallic oxide, inert toward the other ingredients, of the group consisting of the oxides of tin, zinc, titanium, magnesium, iron, and lead, for preventing hard caking of the silicate with the silica when the composition is allowed to stand and settle.

5. A stable, indefinitely-keeping, aqueous liquid polishing composition, comprising finely divided, abrasive silica; sodium silicate, substantially unreactive toward the silica, as a detergent; insoluble metallic oxide, non-poisonous and inert toward the other ingredients, and tending to prevent hard caking of the silicate with the silica when the composition is allowed to stand and settle; and also finely divided calcium sulfate, serving the same purpose.

6. A stable, indefinitely-keeping, aqueous liquid polishing composition, comprising finely divided, abrasive silica; sodium silicate, substantially unreactive toward the silica, as a detergent; and insoluble metallic oxide, non-poisonous and inert toward the other ingredients, for preventing hard caking of the silicate with the silica when the composition is allowed to stand and settle.

7. The composition as set forth in claim 6 wherein the sodium silicate is crystalloidal and of relatively high alkali-silica ratio.

EDWIN W. KELLER.